(12) United States Patent
Mitra et al.

(10) Patent No.: US 10,522,141 B2
(45) Date of Patent: Dec. 31, 2019

(54) VEHICLE VOICE RECOGNITION INCLUDING A WEARABLE DEVICE

(71) Applicant: Ford Global Technologies, LLC, Dearborn, MI (US)

(72) Inventors: Pramita Mitra, West Bloomfield, MI (US); Craig John Simonds, Dearborn, MI (US); Gary Steven Strumolo, Canton, MI (US); Ali Hassani, Ann Arbor, MI (US); Mark A. Cuddihy, New Boston, MI (US); David Melcher, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 15/759,857

(22) PCT Filed: Oct. 28, 2015

(86) PCT No.: PCT/US2015/057689
§ 371 (c)(1),
(2) Date: Mar. 14, 2018

(87) PCT Pub. No.: WO2017/074328
PCT Pub. Date: May 4, 2017

(65) Prior Publication Data
US 2018/0261217 A1     Sep. 13, 2018

(51) Int. Cl.
*G10L 15/22*     (2006.01)
*G10L 15/02*     (2006.01)

(52) U.S. Cl.
CPC .............. *G10L 15/22* (2013.01); *G10L 15/02* (2013.01); *G10L 2015/025* (2013.01); *G10L 2015/027* (2013.01)

(58) Field of Classification Search
CPC ... G10L 15/02; G10L 15/22; G10L 2015/025; G10L 2015/027; B60R 16/0373; H04R 2430/01; H04R 2499/13
See application file for complete search history.

(56) References Cited

U.S. PATENT DOCUMENTS

| | | |
|---|---|---|
| 6,496,107 B1 | 12/2002 | Himmelstein |
| 9,013,300 B2 | 4/2015 | Felix |
| 9,037,125 B1 * | 5/2015 | Kadous ............. H04M 1/72577 455/418 |
| 2004/0015354 A1 * | 1/2004 | Miyauchi ............... G10L 15/22 704/246 |

(Continued)

OTHER PUBLICATIONS

International Search Report and Written Opinion dated Jan. 21, 2016 from the International Searching Authority (12 pages).

(Continued)

*Primary Examiner* — Walter Yehl
(74) *Attorney, Agent, or Firm* — Brandon Hicks; Bejin Bieneman PLC

(57) ABSTRACT

A system includes a wearable device including a memory and a processor. The processor receives a verbal input for a vehicle from a user. The processor interprets the verbal input to locate in the memory at least one datum predetermined to be interpretable by the vehicle computer. The processor generates a message corresponding to the verbal input including the at least one datum, and sends the message to the vehicle.

19 Claims, 4 Drawing Sheets

(56) References Cited

U.S. PATENT DOCUMENTS

| | | | |
|---|---|---|---|
| 2007/0005206 A1* | 1/2007 | Zhang | G06F 3/16 |
| | | | 701/36 |
| 2009/0089065 A1 | 4/2009 | Buck et al. | |
| 2014/0309875 A1 | 10/2014 | Ricci | |
| 2014/0357248 A1* | 12/2014 | Tonshal | H04M 1/6091 |
| | | | 455/418 |
| 2015/0057839 A1 | 2/2015 | Chang et al. | |
| 2015/0081169 A1* | 3/2015 | Pisz | B60H 1/00657 |
| | | | 701/36 |

OTHER PUBLICATIONS

Hyundai Motor America News Bureau, HyundaiNews.com, "Hyundai Blue Link to Debut Smartwatch App with Voice Recognition at 2015 Consumer Electronics Show and Pepcom's Digital Experience" Jan. 2, 2015 (4 pages).

* cited by examiner

VEHICLE VOICE RECOGNITION INCLUDING A WEARABLE DEVICE

CROSS-REFERENCE TO RELATED APPLICATIONS

This application is a national stage of, and claims priority to, Patent Cooperation Treaty Application No. PCT/US2015/057689, filed on Oct. 28, 2015, which application is hereby incorporated herein by reference in its entirety.

BACKGROUND

Vehicles may include computers programmed to recognize speech, and allow an operator to control, e.g., infotainment systems, navigation systems, emergency response systems, etc., via spoken commands. A voice recognition system may be optimized for widely used or standard pronunciations and may further be programmed to expect particular commands. In some examples, commands which are spoken with an accent, or do not conform to expected commands, may not be understood by the vehicle computer, leading to frustration for the vehicle operator or other occupant.

DESCRIPTION

Introduction

Figure 1:
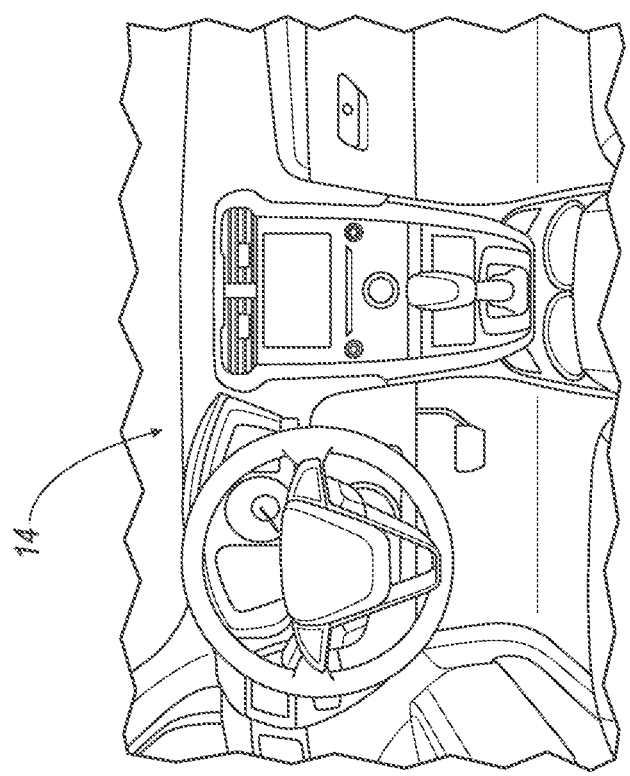
FIG. 1 is diagram of an exemplary system for communicating with a vehicle using a wearable device.
Figure 1:
Figure 1:
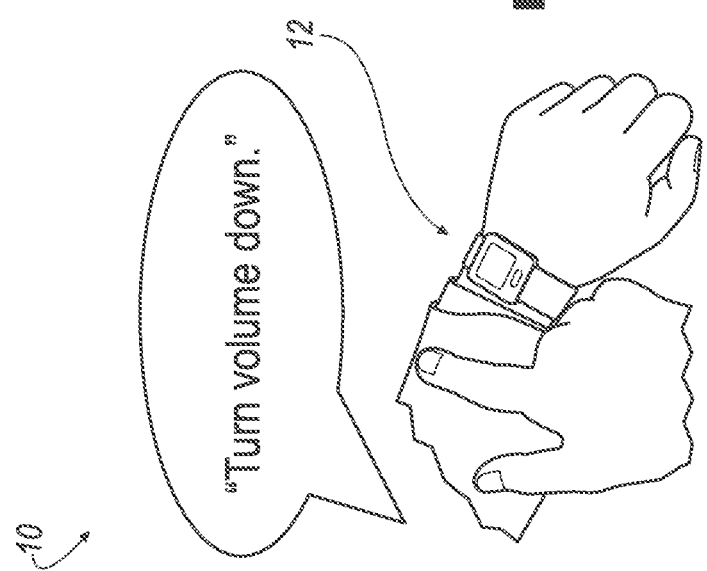
Figure 2:
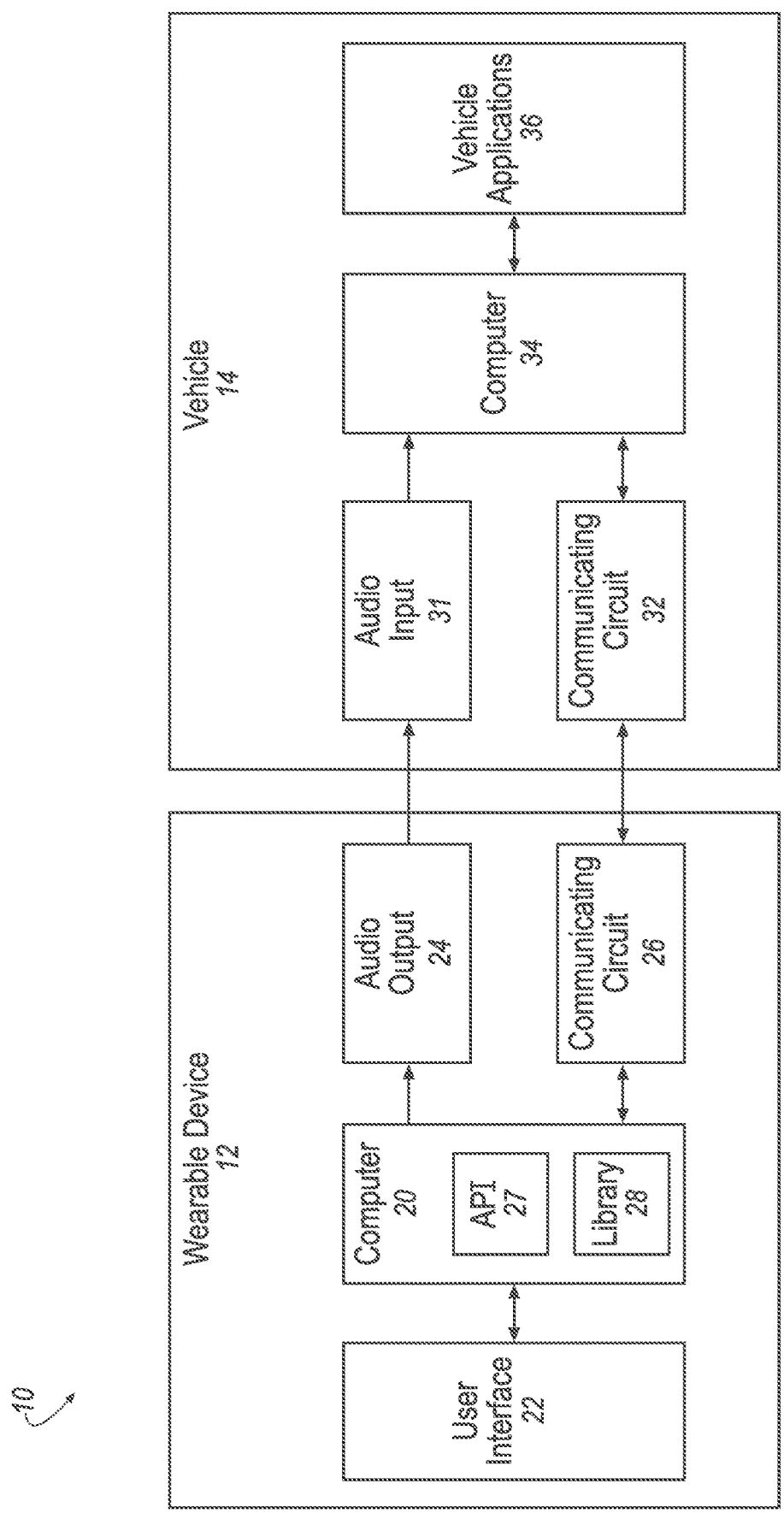
FIG. 2 is a block diagram of the exemplary system of FIG. 1.

Referring to FIG. 1, a system 10 utilizes the voice recognition capabilities of a wearable device 12 to facilitate communications with a vehicle 14. The wearable device 12 may be, e.g., a smart watch, a fitness band, etc. The vehicle 14 may be, e.g., an automobile, truck, motorcycle, tractor, snowmobile, etc., and includes a vehicle computer 34 (FIG. 2). In order to facilitate user communications with the vehicle 14, the wearable device 12 may be programmed to receive user inputs from a user and, based on a library stored in a memory of the device 12, generate vehicle messages that are predetermined to be interpretable by the vehicle computer 34. The user inputs may be verbal inputs. Additionally or alternatively, the user inputs may be gesture inputs or touch inputs. The vehicle message may be, for example, a command to perform a function. The library may include, e.g., phonemes that are predetermined to be interpretable by the vehicle computer 34, and the wearable device 12 may map the user input to the vehicle message on a syllable-by-syllable basis. Additionally or alternatively, the library may include phrases and/or digital codes that are predetermined to be interpretable by the vehicle computer 34, and the wearable device 12 may be programmed to map the user input to a phrase or digital code with a same or similar meaning to generate the vehicle message. The vehicle message may be transmitted to the vehicle computer 34 audibly, e.g., via a speaker included in the wearable device 12 to a microphone included vehicle 14. Additionally or alternatively, the vehicle message may be transmitted to the vehicle computer 34 via a radio frequency transmission, for example, via a Bluetooth connection with the vehicle computer 34.

System Elements

Turning to FIG. 2, as described above, the system 10 includes a wearable device 12 and a vehicle 14. The wearable device 12 is programmed to receive user inputs from a user and transmit the commands to the vehicle 14 computer 34. As noted above, the user inputs may be verbal inputs, gesture inputs, and/or touch inputs. Additionally, the wearable device 12 and vehicle 14 may be communicatively coupled via, e.g., a Bluetooth connection.

The wearable device 12 includes a computer 20, a user interface 22, an audio output 24 and a communications circuit 26.

The computer 20 includes a memory and one or more processors configured to perform programs, i.e., sets of computer-executable instructions, stored in the memory. The computer may be communicative coupled to the user interface 22, the audio output 24 and the communications circuit 26. As described in detail below, the computer 20 may be programmed to receive inputs from a user via the user interface 22, and generate vehicle messages for the vehicle 14. The vehicle messages may be commands to perform a function. The computer 20 may be programmed to transmit the vehicle messages as audible signals to the vehicle 14 via the audio output 24. Additionally or alternatively, the computer 20 may be programmed to transmit the vehicle messages via electrical signals to the vehicle 14, using the communications circuit 26.

As shown in FIG. 2, the computer 20 may include, e.g., stored in a non-volatile memory, an application programming interface (API) 27 and a library 28. The API 27 may be loaded onto the wearable device 12, and may include computer-executable instructions for generating, together with computer code provided with the wearable device 12, vehicle messages. The API 27 may be specific for a particular type of vehicle 14, particular type of vehicle computer 34, and/or a particular type of wearable device 12.

The library 28 may be included in the API 27, or may be a separate file. The library 28 may be loaded onto the wearable device 12 and may include various data items for composing vehicle messages. For example, the library 28 may include phonemes. The phonemes may be sounds, e.g., single syllable sounds, which are predetermined to be interpretable by the vehicle computer 34. As another example, the library 28 may include phrases. The phrases may be multi-word expressions that are predetermined to be interpretable by the vehicle computer 34. An example phrase may be "Turn volume down."

As yet another example, the library 28 may include one or more digital codes or the like, which may be predetermined to be interpretable by the vehicle computer 34. The digital codes may be transmitted to the vehicle computer 34 via the communications circuit 26. Each digital code typically corresponds to a specific vehicle message.

The user interface 22 is communicatively coupled to the computer 20, and may include one or more input devices such as a microphone, buttons, a touch screen display, a mouse, a keyboard, a gesture recognition device, switches, etc., for receiving input from the user. The user interface 22 may further include one or more output devices such as a display, lamps, speakers, etc. for communicating information to the user.

Specifically, the user interface 22 receives user inputs from a user. The user inputs may be received as verbal commands, for example, via a microphone. Additionally or alternatively, the user interface 22 may receive commands as, e.g., touch inputs on a touch screen display, or as gestures via a gesture recognition device, etc.

As described above, the computer 20 may transmit vehicle messages via the audio output 24. The audio output 24 may be, e.g., a speaker. The audio output 24 is shown in FIG. 2 as a separate component from the user interface 22. However, the audio output 24 may be included in the user interface 22.

The audio output 24 may transmit phonemes or phrases which are predetermined to be interpretable by the vehicle computer 34. The phonemes or phrases may be transmitted in an audible range of sound. Additionally or alternatively, the speaker may transmit, and the vehicle computer 34 may be configured to recognize, ultrasonic transmissions.

The wearable device 12 may further include a communications circuit 26. The communications circuit 26 may include, for example, a Bluetooth transceiver, or other radio frequency transceiver, as is known, for communication with the vehicle computer 34. Additionally, the communications circuit 26 may include, e.g., a WiFi transceiver, as is known, for connecting with a WiFi hotspot.

The communications circuit 26 may be used to transmit vehicle messages to the vehicle computer 34. Additionally or alternatively, the communications circuit may be used to download, e.g., from the Internet, or from the vehicle computer 34, the API 27 and library 28.

The vehicle 14 includes an audio input 31, the vehicle computer 34, and vehicle applications 36. The vehicle 14 may further include a communications circuit 32.

The computer 34 includes a memory and one or more processors configured to perform programs, i.e., sets of computer-executable instructions, stored in the memory. The computer 34 is generally programmed for communications on a controller area network (CAN) bus or the like, and may also have a connection to an onboard diagnostics connector (OBD-II). Via the CAN bus, OBD-II, and/or other wired or wireless mechanisms, the computer 34 may transmit messages to and/or receive messages from various devices in the vehicle 14, e.g., the vehicle applications 36. Alternatively or additionally, in examples where the computer 34 actually comprises multiple devices, the CAN bus or the like may be used for communications between devices represented as the computer 34 in this disclosure.

The computer 34 is programmed to receive vehicle messages from the wearable device 12, via the audio input 31 and/or the communications circuit 32. Based on the vehicle messages, the computer 34 is programmed to send instructions to one or more applications 36. For example, one of the applications 36 may be a radio. The computer 34 may receive a vehicle message to play a particular radio station. The computer 34 may send instructions to the radio to tune in the particular radio station.

The computer 34 may be programmed, to perform voice recognition, as is known. In this case, the computer 34 may be programmed to recognize particular phonemes, and to identify words based on sequences of phonemes. Further, the computer 34 may be programmed to identify sequences of words, and associate the sequences of words with actions that the computer 34 may initiate in the vehicle 14. For example, the computer 34 may be programmed to identify "Turn volume down" as a command to reduce the volume of the radio.

Additionally or alternatively, the computer 34 may be programmed to receive digital commands. The digital commands may be received, for example, from the communications circuit 32, and may include one or more digital codes. The digital codes may be associated, for example by a table stored in memory associated with the computer 34, with actions that the computer 34 may perform in the vehicle 14.

Vehicle applications 36 may be any system within the vehicle 14 which may be controlled directly, or indirectly, via user inputs. The vehicle applications 36 may each include a computer including a memory and one or more processors configured to perform programs, i.e., sets of computer-executable instructions, stored in the memory. Each of the vehicle applications may be communicatively coupled, e.g., via a wired or wireless network, with the computer 34, and may be programmed to receive commands from the computer 34 and to execute the commands. The vehicle applications 36 may further include actuators to actuate vehicle functions, e.g., a motor to close or open a window, and may further include a user interface to, e.g., display a movie and/or play music. A non-limiting list of vehicle applications 36 may include, e.g., infotainment systems (radio, CD, DVD), GPS systems, network applications (e.g., a search engine on the Internet, email, traffic updates), emergency response services, interior lights, exterior lights, window lifts, etc.

The audio input 31. The audio input 31 may be a microphone or other sound receiving device as is known. The audio input 31 may also be, e.g., an ultrasonic sensor for receiving air pressure signals at frequencies above the audible range.

As described above, the vehicle 14 may further include the communications circuit 32. The communications circuit 32 may include, e.g., a radio frequency transceiver, as is known, and may be able to receive messages from, and/or transmit messages to, the wearable device 12. For example, the radio frequency transceiver may be a Bluetooth transceiver. The communications circuit 32 may receive the radio frequency transmission from the wearable device 12, extract digital code representing one or vehicle messages from the transmission, and provide the digital code to the computer 34.

Processes

Figure 3:
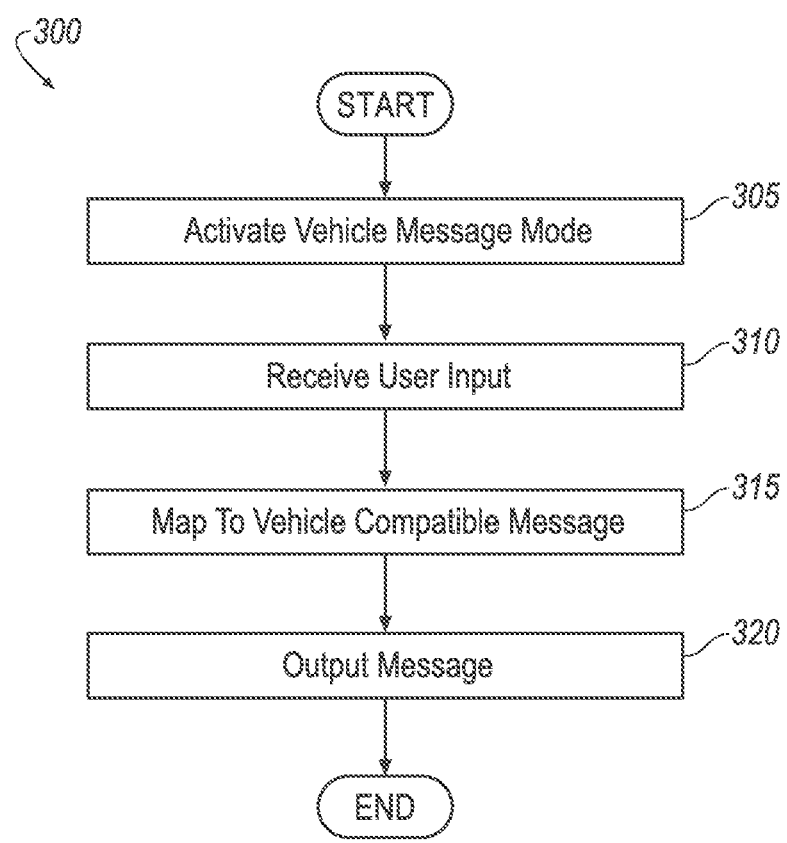
FIG. 3 is a diagram of an exemplary process for receiving a user input and generating a vehicle message by a wearable device.

FIG. 3 is a diagram of an exemplary process 300 for generating, by a wearable device 12, a vehicle message for a vehicle 14 computer 34 based on an input from a user. The input from the user may be, for example, a verbal input. The process 300 starts in a block 305.

In the block 305, the computer 20 of the wearable device 12 may identify a trigger event initiating a vehicle message mode. The vehicle message mode may be a mode in which the computer 20 receives the user input from the user of the wearable device 12, and transmits a vehicle message based on the user input, to the vehicle computer 34. The trigger event may be, for example, a user input via the user interface 22 to activate the vehicle message mode. For example, the user input may be a touch on a touchscreen, which activates an application for generating a vehicle message. Alternatively, the trigger may be a verbal command, such as "activate vehicle message mode." As another possible alternative, the trigger event may be a verbal input to operate a vehicle function such as "Turn on radio." The wearable device 12 may determine, based on recognition of the command, that it is a command intended for the vehicle 14 computer 34, and initiate the vehicle message mode. The process 300 continues in a block 310.

In the block 310, the computer 20 may receive the user input related to a vehicle operation. For example, the computer 20 may receive the input "Turn on radio." In some examples, as described with regard to the block 305, the computer 20 may have already received the user input during execution of the block 305. Upon receiving the user input, the process 300 continues in a block 315.

In the block 315, the computer 20 generates, based on the user input, the vehicle message. In one example, the computer 20 may analyze the user input by syllables. One or more of the syllables of the user input may be mapped to a corresponding phoneme in the library 28. The phonemes may be put together in a sequence corresponding to the syllables of the user input. The phonemes stored in the library may be sounds that are predetermined to be interpretable by the vehicle computer 34. This may be advantageous, when, for example, a user of the wearable device 12 has an accent and pronounces words in a manner that is not interpretable by the vehicle computer 34. The computer 20 of the wearable device 12 may include, for example, voice recognition which can recognize the sounds/syllables from the user, and map the sounds/syllables to phonemes predetermined to be interpretable by the vehicle computer 34.

In another example, the computer 20 may analyze the user input based on words or phrases. The computer 20 may identify words and/or phrases in the user input, and map the words or phrases to words or phrases in the library 28. The mapping may be done on a word-to-word basis. Alternatively, the computer 20 may analyze the user input for meaning, and identify a phrase in the library 28 with a same or similar meaning. For example, the computer 20 may be programmed to identify "Turn down volume", "Reduce volume", "Quieter please", "Please turn down", etc. as commands to reduce the volume of the radio, and map each of these commands to a vehicle message in the library 28 predetermined to be interpretable by the vehicle computer 34. For example, each of these commands may be mapped to a vehicle message "Turn down volume." Further, the computer 20 of the wearable device 12 may include a learn mode to learn the accent of the user. For example, the computer 20 may learn to identify expressions with incorrect grammar, and map them to phrases predetermined to be interpretable by the vehicle computer 34.

In another example, the computer 20 may receive a user input and analyze the command for meaning. The computer 20 may then map the user input to a digital code corresponding to the meaning and generate the vehicle message from the digital code. Upon mapping the user input to the vehicle message, the process 300 continues in a block 320.

In the block 320, the computer 20 outputs the vehicle message. In one example, the computer 20 may output the vehicle message via the audio output device 24 as an audible signal. As described above, the audio output device 24 may also be ultrasonic output device, which may transmit ultrasonic signals to the vehicle computer 34.

In another example, the computer 20 may output the vehicle message via the communications circuit 26. The computer 20 may generate a digital code corresponding to the vehicle message, and transmit the vehicle message as a radio frequency transmission to the vehicle computer 34. As described above, the radio frequency transmission may be transmitted according to a Bluetooth protocol.

Following the block 320, the process 300 ends.

Figure 4:
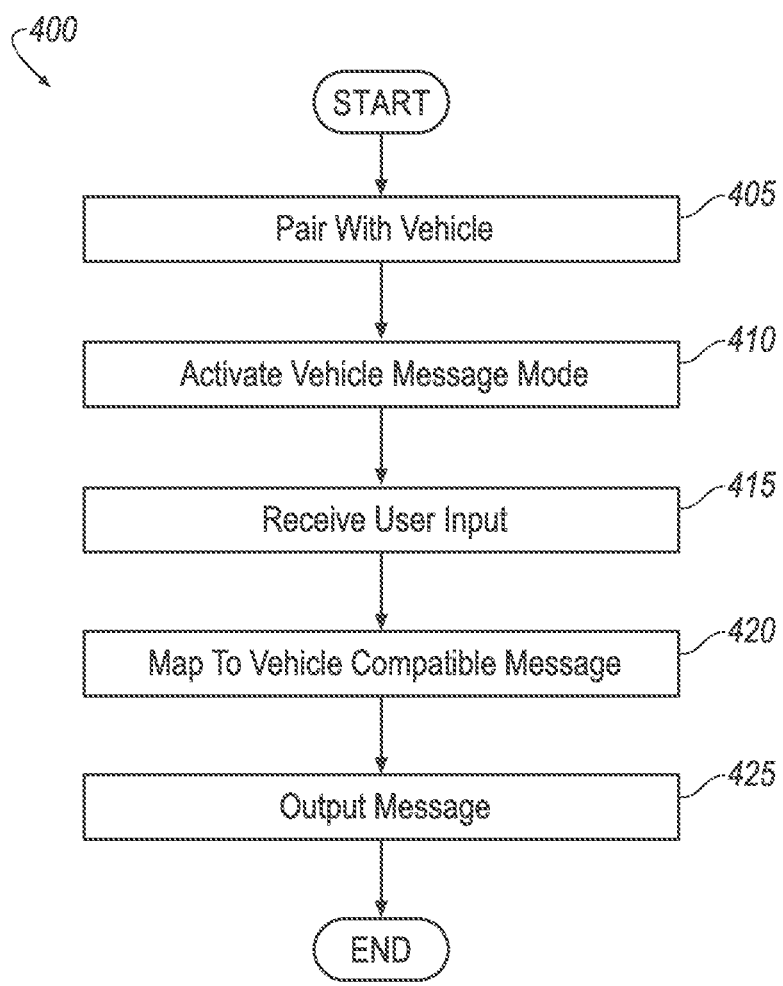
FIG. 4 is a diagram of an exemplary process for receiving a user input and generating a vehicle message by a wearable device, including initial pairing of the wearable device with the vehicle.

FIG. 4 is a diagram of an exemplary process 400 for generating, by a wearable device 12, a vehicle message for a vehicle 14 based on a user input from a user. In the exemplary process 400, the wearable device 12 is paired with the vehicle 14 prior to initiating the vehicle message mode. The process 400 may be applicable, when, e.g., vehicle messages are transmitted via radio frequency signals from the wearable device 12 to the vehicle 14. The process 400 starts in a block 405.

In the block 405, the wearable device 12 is paired with the vehicle 14. For example, the wearable device 12 may, via a Bluetooth interface in the communications circuit 26, send a message including identification of the wearable device 12. The vehicle 12 computer 34 may receive the message, and identify the wearable device 12, as an authorized device for communication with the vehicle 14. The vehicle computer 34 may transmit a message to the wearable device 12, authorizing the wearable device 12 to send vehicle messages via radio frequency transmission to the vehicle 14. The process 400 continues in a block 410.

In the block 410, the computer 20 of the wearable device 12 identifies a trigger event initiating a vehicle message mode, as described with reference to the block 305 of process 300. Based on identification of the trigger event, the computer 20 initiates the vehicle message mode. The process 400 continues in a block 415.

In the block 415, the computer 20 receives a user input related to a vehicle operation, as described with reference to the block 310. The process 400 continues in a block 420.

In the block 420, the computer 20 generates a vehicle message based on the user input. As discussed with reference to block 315, the computer 20 may include voice recognition and may further include a learn mode, and be able to learn the accent of the user. The computer 20 analyzes the user input. Based on the analysis, the computer 20 maps the user input to a digital code included in the library 28 which corresponds to the meaning of the user input. Upon mapping the user input the vehicle message, the process 400 continues in a block 425.

In the block 425, the computer 20 transmits, via the communications circuit 26, the vehicle message to the vehicle 14 computer 34. The vehicle 14 computer 34 may authenticate that the vehicle message was received from the authorized wearable device 12, and may issue one or more instructions to one or more vehicle applications 36 based on the vehicle message.

Following the block 425, the process 400 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A wearable computing device comprising:
   an audio output; and
   a processor and a memory, the memory storing instructions executable by the processor such that the processor is programmed to:
   receive, from a user, a verbal input not interpretable by a vehicle computer;
   interpret the verbal input to locate in the memory at least one datum predetermined to be interpretable by the vehicle computer;
   generate an audio message corresponding to the verbal input including the at least one datum, and
   send the audio message including the at least one datum predetermined to be interpretable by the vehicle computer to the vehicle via the audio output.

2. The device of claim 1, wherein the processor is further programmed to:
   identify one or more syllables in the verbal input;
   match at least one of the one or more syllables with a phoneme in the memory predetermined to be interpretable by the vehicle computer; and
   include the matched phoneme in the audio message.

3. The device of claim 1, wherein the processor is further programmed to:
   determine a meaning of at least a portion of the verbal input;
   match the meaning of the portion of the verbal input with a meaning of a phrase in the memory predetermined to be interpretable by the vehicle computer; and
   include the phrase in the audio message.

4. The device of claim 1, wherein the processor is further programmed to:
   determine a meaning of at least a portion of the verbal input;
   match the meaning of the portion of the verbal command with a meaning of a digital code in the memory predetermined to be interpretable by the vehicle computer; and
   include the digital code in a digital message to the vehicle.

5. The device of claim 4, wherein the wearable computing device further includes a radio frequency transmitter and the processor is programmed to send the digital message via the radio frequency transmitter.

6. The device of claim 1, wherein the processor is further programmed to:
   receive the data predetermined to be interpretable by the vehicle computer from a second computing device.

7. The device of claim 1, wherein the processor is further programmed to:
   pair, prior to receiving the verbal input, the wearable computing device with the vehicle computer.

8. The device of claim 1, wherein the processor is further programmed to:
   receive, prior to receiving the verbal input, an input initiating a vehicle message operation.

9. The device of claim 1, wherein the processor is further programmed to:
   receive, prior to receiving the verbal input, an application programming interface, wherein the application programming interface is associated with the vehicle computer and at least a portion of the instructions executable by the processor is included in the application programming interface.

10. The device of claim 1, wherein the data predetermined to be interpretable by the vehicle computer is related to an application programming interface, wherein the application programming interface is associated with the vehicle computer and at least a portion of the instructions executable by the processor is included in the application programming interface.

11. A system comprising:
    a wearable computing device comprising:
    an audio output;
    a processor and a memory, the memory storing instructions executable by the processor such that the processor is programmed to:
    receive, from a user, a verbal input not interpretable by a vehicle computer;
    interpret the verbal input to locate in the memory at least one datum predetermined to be interpretable by the vehicle computer;
    generate an audio message corresponding to the verbal input including the at least one datum; and send the audio message including the at least one datum predetermined to be interpretable by the vehicle computer to the vehicle via the audio output; and a vehicle computer including a processor and a memory, the memory of the vehicle computer storing instructions executable by the processor of the vehicle computer such that the processor of the vehicle computer is programmed to:

receive the audio message from the wearable device; and instruct, based on the audio message, one or more vehicle applications to perform one or more operations.

12. A method comprising, receiving, by a processor in a wearable computing device, from a user, a verbal input not interpretable by a vehicle computer;

interpreting the verbal input to locate in the memory at least one datum predetermined to be interpretable by the vehicle computer;

generating an audio message corresponding to the verbal input including the at least one datum, and sending the audio message including the at least one datum predetermined to be interpretable by the vehicle computer to the vehicle via an audio output included in the wearable computing device.

13. The method of claim 12, further comprising:

identifying one or more syllables in the verbal input;

matching at least one of the one or more syllables with a phoneme in the memory predetermined to be interpretable by the vehicle computer; and including the matched phoneme in the audio message.

14. The method of claim 12, further comprising:

determining a meaning of at least a portion of the verbal input;

matching the meaning of the portion of the verbal input with a meaning of a phrase in the memory predetermined to be interpretable by the vehicle computer; and including the phrase in the audio message.

15. The method of claim 12, wherein the library includes one or more signals predetermined to be interpretable by the vehicle input device, further comprising:

determining a meaning of at least a portion of the verbal input;

matching the meaning of the portion of the verbal command with a meaning of a digital code in the memory predetermined to be interpretable by the vehicle computer; and including the digital code in a digital message.

16. The method of claim 12, further comprising:

receiving the data predetermined to be interpretable by the vehicle computer from a second computing device.

17. The method of claim 12, further comprising:

pairing, prior to receiving the verbal input, the wearable computing device with the vehicle computer.

18. The method of claim 12, further comprising:

receiving, prior to receiving the verbal input, an input initiating a vehicle message operation.

19. The method of claim 12, further comprising:

receiving, by the vehicle computer, the audio message from the wearable device; and instructing, by the vehicle computer, based on the audio message, one or more vehicle applications to perform one or more operations.

* * * * *